June 11, 1957 R. H. WISE 2,795,414
WINDOW OPERATING DEVICE
Filed July 3, 1953 2 Sheets-Sheet 1

INVENTOR.
RALPH H. WISE
BY
Charles S. Penfold
ATTORNEY

June 11, 1957  R. H. WISE  2,795,414
WINDOW OPERATING DEVICE
Filed July 3, 1953  2 Sheets-Sheet 2

INVENTOR.
RALPH H. WISE
BY
ATTORNEY

United States Patent Office 2,795,414
Patented June 11, 1957

2,795,414

WINDOW OPERATING DEVICE

Ralph H. Wise, Gary, Ind., assignor to Productive Inventions, Inc., a corporation of Indiana Application July 3, 1953, Serial No. 365,834

8 Claims. (Cl. 268—117)

This invention is directed to a driving mechanism for operating a device such as a window or other closure.

The mechanism may be used wherever applicable but has proven successful in operating the pivotally mounted ventilating window of an automotive vehicle.

Various means have been employed to operate such windows. Manually operated cranks are being utilized for this purpose and electric motors and hydraulic power are now being adopted for such use on certain makes or models of cars.

None of the different types of window operating means have proven entirely satisfactory from the standpoint of providing sufficient power or leverage to force the edges of the window into proper sealing relationship with the weatherstrip carried by the frame.

Some of the operating devices now in use are also comprised of a multiplicity of rather intricate parts which are difficult to assemble and require periodic adjustment to maintain them in proper working order. Other operating devices for this purpose are expensive, relatively heavy and do not lend themselves for convenient or easy installation in a car door.

With the foregoing in mind, one of the principal objects of the invention is to provide a window operating device embodying improved principles of design and construction.

An important object of the invention is to provide the lower vertical pivot or shaft member of a window with a crank and the shaft of an electric motor with a crank, and pivotally connect the extremities of the cranks by a link in such a manner that rotation of the motor shaft and its crank will cause oscillation of the window and its crank. The length of the link and cranks and their disposition is such that when the axes of the pivotal connections between the link and cranks are out of alignment with the axis of the motor shaft, the window will more or less be open. More particularly, the arrangement is preferably such that, when the pivotal connection between the link and the crank on the motor shaft is aligned with the shaft axis and the pivotal connection between the link and the crank of the window, the edges of the window will be forced into sealing relationship with the weatherstrip.

Another object of the invention is to provide a driving mechanism in which one extremity of the link is pivotally and slidably connected with one of the cranks and resilient means are associated with the link to assist in forcibly maintaining the edges of the window in intimate sealing relationship with the weatherstripping material.

A particular object of the invention is to provide a setup whereby the power unit is adjustably supported, the link is adjustable, and an adjustable connection is provided between the power unit and crank carried thereby.

A further object of the invention is to provide a driving assembly comprised of few components which afford advantages with respect to manufacture and assembly and installation.

Other objects and advantages of the invention will become apparent after the description hereinafter set forth is considered in conjunction with the drawing annexed hereto.

Referring to the drawings.

Figure 1:
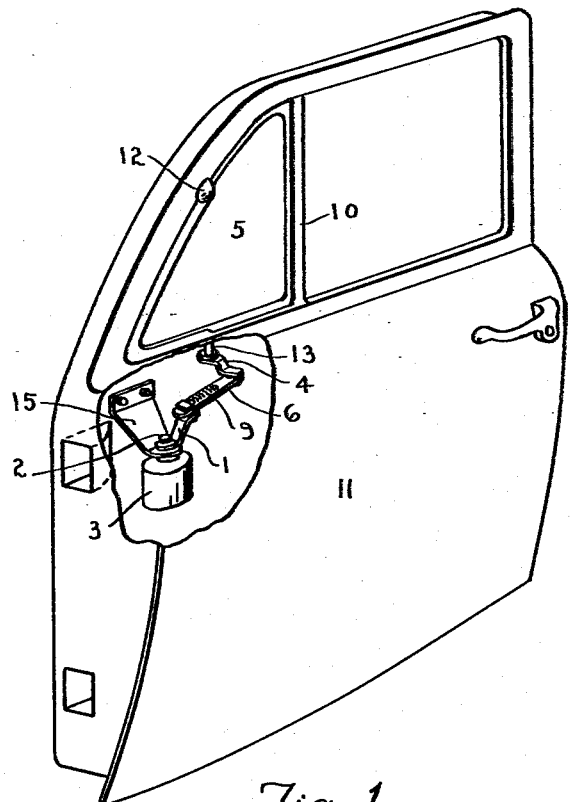
Figure 1 is a perspective view of a vehicle door showing the application of the invention.
Figure 2:
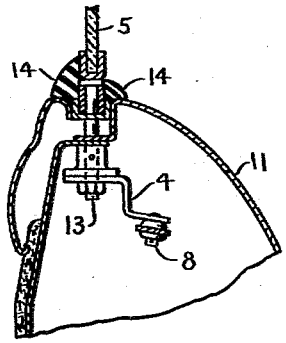
Figure 2 is a partial transverse section taken through the vehicle door showing a crank carried by a shaft extending from a window, the latter of which is adapted to be manipulated by the mechanism constituting the invention.

As exemplified in the drawings and particularly in Figure 1, the device comprises, among other things, a primary crank 1 keyed to a shaft 2 of a suitable power unit preferably in the form of an electric motor 3, a secondary crank 4 carried by a generally triangular ventilating window 5, an elongated link 6 having its extremities respectively pivotally connected to the ends of the cranks by pivot pins 7 and 8, and resilient means preferably in the form of a helical spring 9 for normally urging the link outwardly from the pivot pin 7.

The window 5 is mounted for oscillatory movement about a vertical axis within a generally triangular frame 10 constituting a part of a vehicle door 12. More particularly in this regard, the inclined side of the window is pivotally connected to the inclined side of the frame 10 as indicated at 12 and the lower side of the window is provided with a vertical shaft 13 which extends downwardly through the lower side of the frame 10 and the secondary crank 4 is keyed to this shaft.

The window frame 10 is provided with resilient weatherstripping material 14 arranged so that inner and outer portions of the edges of the window will engage the material when the window is closed.

Figure 3:
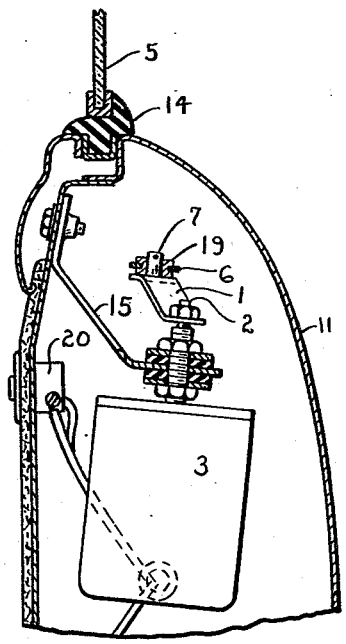
Figure 3 is a partial vertical section taken through the vehicle door showing the manner in which the power unit is mounted.
Figures 4, 5:
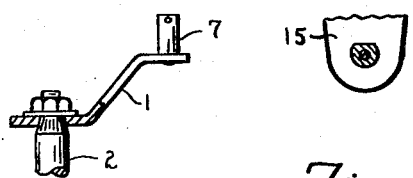
Figure 4 is a partial vertical section showing the mode of connecting the crank to the drive shaft of the power unit.
Figure 5 is a partial view showing how the power unit or motor is keyed or held against rotation on a bracket supporting the motor.

The electric motor 3 may be operated by any suitable controlling mechanism (not shown) for stopping the motor to locate the window in a fully closed position. As shown in Figures 3 and 5 the motor is detachably supported and keyed against movement on a bracket 15 adjustably carried by the lower part of the frame 10 so that the axis of the motor shaft 2 is disposed in spaced parallel relationship to the axis of the depending shaft 13 on the window and the axes of the pivot pins 7 and 8 which connect the link and cranks together.

The drive shaft is provided with a splined tapered portion and the inner end of the primary crank is provided with an opening which is preferably serrated or splined so that the crank may be secured to the shaft in any one of a plurality of positions.

The link 6 is not only pivoted to the primary crank 1 but is also preferably slidably connected thereto by means of a longitudinal slot 16 in the link which slidably receives the pivot pin 7. The helical spring 9 is more or less disposed in the slot with one end of the spring being caught on a projection 17 formed on the link adjacent the outer end of the slot. The inner end of the spring is caught on a projection 18 carried by a fitting 19 secured to the pivot pin 7. This spring takes up any lost-motion resulting from the pin and slot connection and normally urges the link outwardly from the pivot pin 7.

Figure 8:
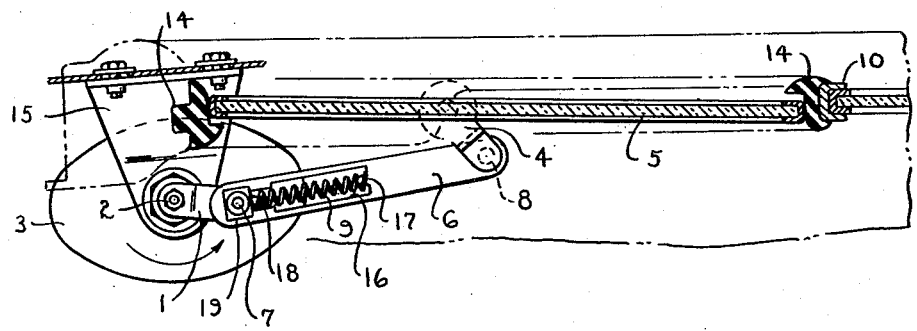
Figure 8 is a transverse section similar to Figure 7 showing the window in a partially closed position.

It will be noted that the cranks are arranged in a predetermined angular relationship to obtain the desired leverage or thrust and that when the window is open as illustrated in Figure 8, the pivot pin 7 is normally out of alignment with the motor shaft 2 and the pivot pin 8.

Figure 7:
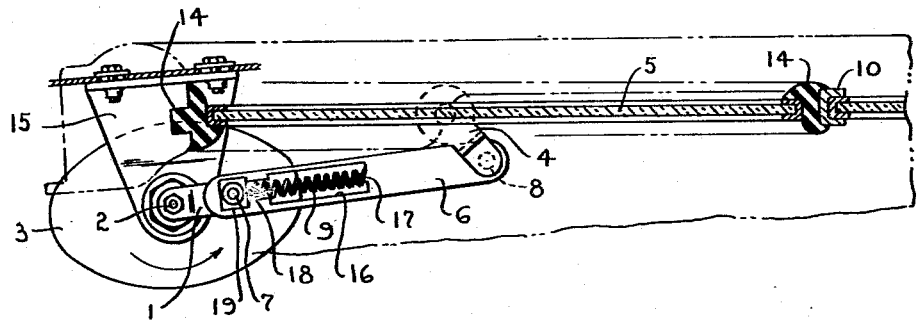
Figure 7 is a transverse section exemplifying the relative positions of the components of the mechanism for maintaining the window operated thereby in a closed position.

A switch 20 operatively connects the motor 1 with a battery or other source of electricity. When the switch is operated the drive shaft of the motor will rotate the primary crank 1 in a counterclockwise direction indicated by the arrow as illustrated in Figure 7 and cause the link to pivot with respect to the cranks and swing the secondary crank in a clockwise direction to move the window about its vertical axis. More specifically in this regard and as illustrated in Figure 4, whenever the window is in any open position the pivot pin 7 will always be out of alignment with respect to the drive shaft and the pivot pin 8. When, however, the motor is further operated by manipulating the switch 20 the primary crank will swing the link 6 so that the pivot pin 7, including the link, will be aligned with the motor shaft and the pivot pin 8, and when so aligned the edges of the window will be forced into intimate contact or sealing relationship with the weatherstripping material 14 as clearly illustrated in Figure 7. As pointed out above, any suitable control mechanism, in addition to the switch, may be employed for stopping the electric motor in a position to locate the pivot pin 7 in alignment with the shaft axis and pivot pin 8. To open the window it is merely necessary to operate the switch so that the pivot pin 7 is not in alignment with the shaft 2 and pivot pin 8.

The helical spring 9 above referred to serves to gradually ease the edges of the window 5 into intimate sealing relationship with the weatherstripping material and maintain this relationship when the pivot pins and the drive shaft are aligned as illustrated in Figure 7. More specifically in this respect, the spring is compressed whenever the pivot pin 7 slides in the slot 16 of the link. When the pivot pin 7 is aligned with the shaft 2 and the pin 8 the spring is compressed to the fullest extent permitted by the assembly. This force created by the spring provides thrust which assists in closing the window. The helical spring also functions to compensate for any variable conditions that may exist with respect to its installation. If, for example, the primary crank is secured to the drive shaft a few degrees on either side of the predetermined fixed position in which it would normally be set the spring will compensate for such variable.

Figure 6:
Figure 6 is a modified form of link which may be utilized in connecting the cranks of the device together.

As clearly illustrated in Figure 6, the link may take the form of a turnbuckle having corresponding members 21 adapted to be pivotally connected to the ends of the cranks. When a rigid link is employed, and the window is closed, the arrangement will afford a means for positively locking the window in place. However, when a spring, such as 9, is utilized, it is desirable to use a separate lock because the window may be opened slightly when pressure is applied thereto on one side of its pivoted axis.

Having thus described my invention, it is obvious that various other modifications may be made in the same without departing from the spirit of my invention; hence I do not wish to be understood as limiting myself to the exact forms, constructions, arrangements and combinations of parts herein shown and described or uses mentioned.

I claim:

1. Apparatus comprising, a frame provided with weatherstripping material, a window supported for movement in the frame, a rotatable shaft supported in a substantially vertical position adjacent the frame, a primary crank member fixed on the shaft, a secondary crank member carried by the window, an elongated link member, pivot means pivotally connecting the ends of the link to the cranks, the axis of the shaft and the axes of the pivot means being disposed substantially in parallel relationship, and motor means carried by the shaft for rotating the primary crank member to operate the other members to actuate the window, the arrangement being such that when the points of connection between the link and cranks are aligned with the axis of the shaft the window will be locked in place with the edges of the window in forced engagement with the weatherstripping material.

2. Apparatus of the kind described comprising, a frame provided with weatherstripping material, a window, means including a shaft pivotally supporting the window in the frame, a crank carried by the shaft, an elongated link having one end connected to the crank, a slot provided in the link, a member slidable in the slot, a spring acting on the link and member, a rotatable shaft operatively connected to the member, and a motor operatively connected to the rotatable shaft, the arrangement being such that when the rotatable shaft is operated by the motor to one rotative position the window will be open and when operated to another position the member will compress the spring so the latter will drive the link to cause the edges of the window to forcibly engage the weatherstripping material.

3. A driving mechanism for operating a closure comprising a rotatable driving element, a pair of cranks, one of said cranks being connected to the driving element and the other crank being constructed for connection with a closure, an elongated link, pivot means pivotally connecting one end of the link to said other crank, means pivotally and slidably connecting the other end of the link to the crank connected to the driving element, the axis of said driving element being disposed in substantially parallel relation to the axis of said pivot means, and a motor unit operatively connected to the driving element.

4. Apparatus comprising, a frame, a closure supported for movement in the frame, a rotatable shaft supported adjacent the frame, a primary crank fixed on the shaft, a secondary crank carried by the closure, an elongated link, pivot means pivotally connecting the ends of the link to the cranks, the axes of said shaft and pivot means being disposed substantially in parallel relation and means for rotating the shaft to actuate the cranks, link and closure, the arrangement being such that when the points of connection between the link and cranks are aligned with the axis of the shaft the closure will be locked in place with respect to the edges of the frame.

5. Apparatus of the kind described comprising, a frame provided with weatherstripping material, a window, means including a shaft pivotally supporting the window in the frame, a crank keyed to the shaft, a rotatable shaft, the axes of said shafts being disposed substantially in parallel relation, a crank keyed to the rotatable shaft, a link having its ends pivotally connected to the cranks, a motor unit operatively connected to the rotatable shaft, the arrangement being such that when the rotatable shaft is moved by the motor unit to one rotative position so that the link is not in alignment with the axis of the rotatable shaft the window will be open and when moved to another position to effect alignment the edges of the window will be forcibly maintained in engagement with the weatherstripping material.

6. Apparatus of the kind described comprising a frame provided with an opening, a closure mounted for movement to close and open the opening, a vertical driven shaft for moving the closure, a crank having one end attached to the driven shaft, a bracket carried by the frame, a motor secured to the bracket and provided with a drive shaft extending vertically through the bracket, the axes of said shafts being disposed in substantially parallel relation, a crank having one end attached to the drive shaft, an elongated link having its ends respectively pivotally connected to the opposite ends of the cranks, the arrangement being such that when the drive shaft is operated by the motor to place the closure in an open position the crank on the drive shaft and the link will be disaligned and when operated to fully close the opening such crank and link will be aligned to lock the closure in place.

7. Apparatus of the kind described comprising a frame provided with an opening, a closure mounted for movement to close and open the opening, a driven shaft for moving the closure, a crank having its inner end attached to the driven shaft, a bracket carried by the frame, a drive shaft mounted on the bracket, a crank having its inner end attached to the drive shaft, an elongated link having one extremity pivotally connected to the crank on the driven shaft, a spring pressed member supported for movement adjacent the other extremity of the link, and means pivotally connecting the member with the crank on the drive shaft in a manner whereby operation of the drive shaft in one direction will cause the member to move relative to the link and act on the spring so the latter will influence movement of the link to actuate the crank on the driven shaft.

8. Apparatus of the kind described comprising a frame, a driven shaft mounted on the frame for actuating a movable component, a crank having one end attached to the driven shaft, a bracket carried by the frame, power means suspended on the bracket and having a drive shaft extending upwardly through the bracket, a crank having one end attached to the drive shaft, an elongated link having one end pivotally connected to the crank on the driven shaft, a member slidably mounted adjacent the other end of the link, resilient means acting on the member, means pivotally connecting the member with the other end of the crank on the drive shaft in a manner whereby operation of the power means to rotate the drive shaft in one direction will cause the member to slide on the link and compress the resilient means so the latter will influence movement of the link to actuate the crank on the driven shaft.

References Cited in the file of this patent

UNITED STATES PATENTS

| | | |
|---|---|---|
| 960,653 | Longtine | June 7, 1910 |
| 1,171,979 | Rixson | Feb. 15, 1916 |
| 2,161,199 | Rhein et al. | June 6, 1939 |
| 2,332,731 | Lakin | Oct. 26, 1943 |

FOREIGN PATENTS

| | | |
|---|---|---|
| 938,557 | France | Apr. 5, 1948 |